US007876779B2

(12) United States Patent
Wilson

(10) Patent No.: US 7,876,779 B2
(45) Date of Patent: Jan. 25, 2011

(54) CONTROLLER AND ADAPTERS TO ENABLE UNLIKE DEVICE INTEGRATION

(75) Inventor: Mathew Philip Wilson, Larkspur, CO (US)

(73) Assignee: Ayaion, Inc., Larkspur, CO (US)

( * ) Notice: Subject to any disclaimer, the term of this patent is extended or adjusted under 35 U.S.C. 154(b) by 0 days.

(21) Appl. No.: 12/378,122

(22) Filed: Feb. 11, 2009

(65) Prior Publication Data

US 2009/0316720 A1 Dec. 24, 2009

Related U.S. Application Data

(60) Provisional application No. 61/065,752, filed on Feb. 14, 2008.

(51) Int. Cl.

| | |
|---|---|
| ***H04J 3/16*** | (2006.01) |
| ***H04J 3/22*** | (2006.01) |
| ***H04L 12/50*** | (2006.01) |
| ***H04L 12/28*** | (2006.01) |
| ***H04L 12/56*** | (2006.01) |
| ***H04L 12/66*** | (2006.01) |

(52) U.S. Cl. ....................... 370/466; 370/359; 370/419; 370/463

(58) Field of Classification Search ................. 370/359, 370/419, 463, 466
See application file for complete search history.

(56) References Cited

U.S. PATENT DOCUMENTS 6,049,543 A * 4/2000 Sauer et al. ................. 370/335
6,879,592 B1 * 4/2005 Hirayama et al. ........ 370/395.1

* cited by examiner

*Primary Examiner*—Ronald Abelson
(74) *Attorney, Agent, or Firm*—Leyendecker & Lemire, LLC

(57) ABSTRACT

A device that schedules the transmission of information between system components, paired with different data adapters, allows for a system that can transmit data between unlike devices. The system focuses on allowing electronic devices to be used in more facets than the intended application. A user is able to hook up multiple source devices including computers, cable boxes, heating systems, et. al. and interact with them on different output devices. Based on the output device television, speakers, monitors, et. al. and the control device, i.e. a remote, keyboard, Wii Mote™, et. al. the interaction with the source device will be tailored to provide the most natural interaction. This will also allow unlike devices to be used together in order to create a synergistic effect.

20 Claims, 13 Drawing Sheets

Signal-In Adapters

Signal-Out Adapters

Control-Out Adapters

Control-In Adapters

CONTROLLER AND ADAPTERS TO ENABLE UNLIKE DEVICE INTEGRATION

RELATED APPLICATIONS

This application claims the filing date benefit of Feb. 14, 2008 from U.S. 61/065,752. U.S. Ser. No. 11/608,190 was examined in detail as it tries to accomplish similar goals. However, it relies on an additional device in order to control the system. The invention described within is able to operate without a similar control device.

BACKGROUND

There has been an explosion of media, not just in content but in formats. Media is now spread across a vast spectrum of incompatible hardware. Legal forms of acquiring media have grown into online markets allowing consumers to purchase media for a variety of devices. Each system used to purchase media has a specific persistent layer of hardware through which the particular media is accessed and enjoyed.

iTunes™ (online media supplier) for instance is made for the iPod™ (hardware). ITunes™ uses encryption to ensure that the iPod™ will be the only hardware that has access to play the desired media. Even though the consumer owns the media, the overhead to take iTunes™ purchased media and put it onto other devices besides an iPod™ is enormous but legal.

Furthermore, after consumers choose their preferred media suppliers, they are restricted to stay in the hardware domain that the content was purchased in. Downloading a movie online condemns the consumer, without additional hardware, to be stuck watching movies on the computer. To take the movie and watch it on a television involves a particular solution designed for connecting computer and television video. To then use a sound system for that movie requires a different solution specifically crafted for connecting computer audio output and a sound system.

Along with the diversification of media, there has also been increasing demand for affordable and reliable home automation systems. Home automation, in the grandest scheme, is a system that is able to communicate with all the electronic devices in the house and provide a common interface for all of the components of the system. There are systems that have been made custom for individual homes and there are systems with components a la carte that can be installed by the consumer. Both of these methods currently require either some technical background or the assistance of someone with a technical background.

There are a few key components that have recently become major sales points to consumers; power management and reporting, control of heating ventilation and air conditioning (HVAC) systems, monitoring of security systems, and integrated telephony services. Unfortunately the cost of upgrading the existing systems is too great for the average consumer to consider. For instance in order to interface with the heating systems of a house a new furnace might need to be installed.

The two areas of Home Automation and Media Control have originally been separated by markets. Some companies choose to provide purely media solutions such as: a sling-box or a link station; while others have been in the sole business of home automation and smart devices like the company x10. There have been a few different strategies to create these systems. Some work with standards groups to create compatible devices. Others create a myriad of custom devices which only work with their custom system. Still others use existing communication protocols to integrate the different devices but then have separate control devices.

What separates this invention from similar systems in intent is the user interaction and the design which is required to accomplish this. The invention has no specific control devices, no specific source devices, and no specific output devices. The invention allows for existing devices to be utilized to their designed purposes with only the addition of signal conversion hardware and a few algorithms. To illustrate, if a user wished to view a movie stored on an iPod™ connected to the system, the user would use the television remote control to turn the television on. The user would then be presented with a menu with different available source devices which she would then browse using the same remote. Once the iPod™ is selected, a list of available movies and songs would be presented to the user. The iPod™ would then provide the proper video data after a selection is made and it would be displayed on the television. A key aspect to this process is that different control devices will result in different user interfaces. If the same process was performed on a computer, a different browsing style would be presented to optimize use with a mouse instead of a remote.

SUMMARY OF THE INVENTION

There are five main components to this system: the Data Schedular orchestrates the communication between the rest of the components; the Signal-In Adapter interfaces with a source device and converts the source signal into a universal System Format; the Signal-Out Adapter interfaces with an output device and converts the System Format to the proprietary signal for the given output device; the Control-In Adapter takes input from control devices and converts the command into the System Format; lastly, the Control-Out Adapter provides the control signals to the source device from the System Format. Together these five components create a system that is able to interface with any output, source, and control device.

Data Scheduler

The Data Schedular is basically a miniature computer with access to different communication medium and protocols. One embodiment has an operating system installed and provides server functionality such as backing up data, providing licenses for programs, and computer functionality. The basic embodiment of the Data Scheduler provides one function, and that is to facilitate communication with the different adapters of the system.

The Data Scheduler is the primary focus of the technology. All the other components can be built by users, or purchased from other vendors. The Data Scheduler takes these parts and combines them into one system providing an easy standard for others to work off of. There can be multiple Data Scheduler's working together in a tree structure, but there will always be one master Scheduler which is in charge of allocating the bandwidth to the other schedulers working as slaves.

All data that passes through the Data Scheduler is in a System Format. This System Format represents all signals regardless of the source or purpose. The Data Scheduler is basically a data router and bandwidth manager. It will listen to requests from the different adapters and coordinate the proper transaction.

A communication line is always reserved from the Data Schedular to the adapters. When an adapter needs to get or send a resource, it sees if the schedular is busy and if it is not, it makes its request. The Data Schedular then takes the request and does any processing on the System Format that needs to be done. This means constructing instruction tasks to send to a Control-Out Adapter, or calculating and allocating the optimum bandwidth for the request. The data schedular then sends out the instructions to the Adapters and goes back into standby mode where it runs processes to maintain the system, but is not actively participating in any of the content streaming.

If there are multiple Data Schedulers, then a master is decided based on a balance of which has the most power, which one is online for the longest percentage of time, and how strong the communication signals are between all the Adapters with that master. The Master Data Scheduler acts basically the same way that the Slave Data Schedulers work, except that it will tell the Slave Schedulers how much bandwidth they have to work with. It is then up to the Slave Scheduler to set up all of the adapters it is responsible for within the assigned bandwidth. A Slave Scheduler can request more bandwidth the same way an adapter makes a request and the Master Scheduler will try to comply. In this way an apartment complex could have multiple systems and still be able to operate optimally by working together in order to maximize the throughput of the signals.

An embodiment of a Data Scheduler could contain a repeater, or a repeater could be present on its own in order to amplify or change the communication medium of the System Format. With the Data Scheduler at the head and the rest of the adapters present, a very powerful system emerges where the home users gain full control of all of their devices and are able to use their existing hardware without the need for outfitting their home with new devices compatible to some other proprietary solution. The task of this system is to forge compatibility between incompatible products.

Another task of the Data Schedular is to assist with the Control Adapters. More information about how this interaction occurs can be found in the Control Adapter sections. The Data Schedular has an active roll in the control of the system because it provides the user interface. The user interface is displayed through the Signal-Out Adapters. The Data Scheduler takes the System Format from a Control-In Adapter and analyzes the state of the Signal-Out Adapter to calculate the appropriate interface. Given this context, the Data Schedular will then provide an instruction list to be passed along to the Control-Out Adapter.

Signal-Out Adapter

The Signal-Out Adapter is responsible for converting the System Format into the proper proprietary signal for the given adapter. A Signal-Out Adapter is often made up of, but is not limited to, hardware that takes the System Format and provides analog or digital information to the attached output device. A Signal-Out Adapter is used in several major embodiments: it can be present in the same housing as other components of the system; it can be made up of hardware connected to the Data Scheduler; it can be made up of software installed on the Output Device or on the Data Scheduler; lastly, it can be made of the signal processing hardware along with transmission antennas.

An embodiment of a Signal-Out Adapter that is connected to the Data Schedular is an adapter that allows for an output device to be connected directly to the Schedular. The Schedular transmits the output data directly to the Signal-Out Adapter encoded in the System Format. It should be noted that this embodiment is really no different from that of a Signal-Out Adapter which has access to an antenna, in this case the communication channel is a custom internal one instead of ethernet or some other communication medium.

An embodiment of a purely software Signal-Out Adapter is software that is installed on a computer with the intent of using the monitor as an output device. The software would allow for the laptop to watch video using its own wireless antenna. Software can also be installed on the Data Schedular which would utilize an existing device's output methods. A passive control or display device such as a thermostat, which does not contain any logic circuitry, could be used by the Schedular to display custom menus. A color touchscreen display that receives display data from a base station could be hijacked, in essence, by the Data Scheduler by using the same Bluetooth™ interface that the display uses to communicate with its original system.

An embodiment of a Signal-Out Adapter with a wireless antenna is one that would be placed next to a television set in the home. The Signal-Out Adapter would transform the System Format into the video to be displayed. The System Format would be received over the antenna which is present in this embodiment. The antenna could also be an ethernet port, USB cable, Zigbee™ antenna, or any other communication channel capable of transmitting the System Format. In this example, a Signal-In card may be combined with the Signal-Out card to allow for local Input Devices to be connected as well. There may be several Signal-In components present even. This type of combined card would consist of multiple antenna's to allow for both adapters to work simultaneously.

Signal-In Adapter

The Signal-In Adapter is responsible for converting the proprietary signal for the given data source into the System Format. A Signal-In adapter is often made up of, but not limited to, hardware that performs appropriate signal processing functions in order to digitize the signal into the System Format. A Signal-In Adapter has three basic types of embodiments: it can be made up of purely signal processing hardware and directly connected to the Data Scheduler; it can be made up of purely software and be installed on the Data Schedular or on the Input Device; lastly, it can be made of the signal processing hardware and an antenna to be placed remotely.

An embodiment of a directly connected Signal-In Adapter is an adapter that has to be housed wherever a Data Schedular is located. A cable box transmitting over a standard RCA connector, for instance, is connected to the Signal-In Adapter. This Signal-In Adapter would transform the component video (YPbPr) into the System Format by properly filtering and sampling the signals. The System Format is then accessible to the Data Schedular and can be routed through one of the available communication methods.

An embodiment of a software Signal Adapter uses drivers that utilize existing communication resources and describes interaction with a source device. A furnace, which is controlled by a Zigbee™ thermostat, could be added to the system by utilizing the Data Scheduler's Zigbee™ antenna. A software driver will function as the Signal-In Adapter and would describe how to report the status of the heating device. In this manor, the status of the house can be checked on any Output Device that is connected to the system, even through an audio device if the driver permits.

An embodiment of a Signal-In Adapter that consists of hardware but is remotely placed is an adapter that has the same signal processing hardware as the locally connected version, but it contains its own transmission antennas. A DVD player is connected to this device allowing access to the DVD player in a remote location from the Data Scheduler. After the signal is converted into the System Format, the Data Schedular tells the Signal-In Adapter the communication channel properties. The Signal-In Adapter then transmits on that channel using its own antenna.

Control-In Adapter

The Control-In Adapter is responsible for interfacing with the Control Devices. It contains the appropriate sensing hardware which can be Infrared, Bluetooth™, USB, PS2 keyboard port, and many others. With the proper Control-In Adapter any Control Device can be used to interface with the system. Like the rest of the adapters in the system, it can be its own hardware entity, purely a software driver, or combined with other components. Control-In Adapter's will often be tied directly to the Signal-Out Adapters since this is where the feedback to the user is displayed.

An embodiment of a Control-In Adapter is an infrared receiver for a remote control. This infrared receiver will be able to pick up any IR signals from the Control Device and transform them into the System Format. The Control-In Adapter will then either broadcast the input to the Data Schedular or use the Signal-Out Adapter to transmit the information. In most cases a Control-In adapter will have to be bed to a Signal-Out Adapter since the control code is context based and depends on the current state of the Signal-Out Adapter. One example where this would not be the case is a Control-In Adapter connected to the Data Schedular.

There are many other types of Control-In Adapters and they can accept inputs from wireless keyboards, mice, Bluetooth™ devices, Zigbee™ devices, and even a Wii Mote™. The Data Schedular will provide different forms of interaction depending on which Control-In Adapter is used. See the Data Schedular for more information.

Control-Out Adapter

The Control-Out Adapter is the inverse of a Control-In Adapter. It is often attached to the Signal-In adapter and provides control signals to the Source Device. As with all of the other components, it can come manufactured with one or all of the other adapters. The Control-Out Adapters take the System Format and transform them into command signals to the device. These command signals can be simple i.e. changing the channel, or complex i.e browsing through media on a computer. The System Format will describe the desired task and it will be up to the Control-Out Adapter to make it happen. Unlike the Control-In Adapter, the Control-Out Adapter does not need a context, meaning it can preform a task without knowing aggregate information from the rest of the system.

Going back to the furnace example, a Control-Out Adapter could be attached directly to the furnace, or if the furnace is Zigbee™ compatible, the Control-Out Adapter could purely be software and utilize an existing Zigbee™ antenna. The Control-Out adapter would take the commands from the Data Schedular and turn up and down the heat. With this system, while watching television, someone could turn up or down the heat.

BRIEF DESCRIPTION OF DRAWINGS

FIG. 7 shows an example of what a base station might look like.

DETAILED DESCRIPTION OF DRAWINGS

Figure 1:
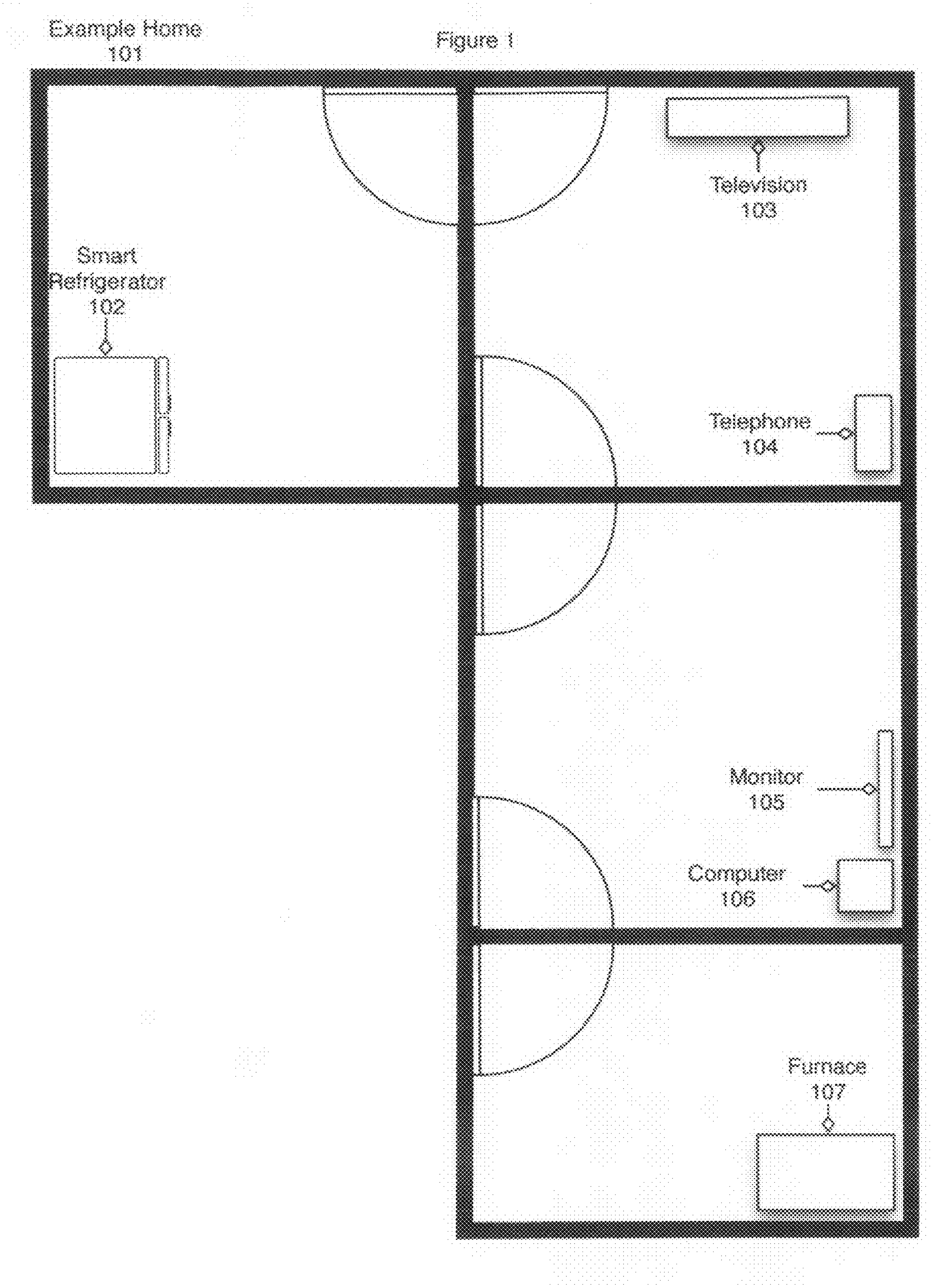
FIG. 1 shows common household devices and how they can interact with each other.

To start, FIG. 1 contains an example home 101 which has several systems connected to the invention. There is a smart fridge 102 which has a touchscreen display that communicates through ethernet; a television 103 which has a remote control that communicates through Infrared Signaling; a telephone 104 which communicates over phone lines that are controlled through touch tones; a monitor 105 for a computer 106 which is controlled by a mouse and keyboard that communicate through USB; and a furnace 107 which is controlled by a thermostat that communicates through Zigbee™

The types of interactions that can occur when these devices are interfaced with the invention follow. Someone at the refrigerator 102 would decide that the room temperature is to cold. She would then use the touchscreen on the refrigerator 102 to browse to the furnace 107 controls and set the heat. It is important to note that the smart refrigerator 102 is an off the shelf design and not proprietary to the invention. The invention modifies the refrigerator 102 as explained later in order to work with the rest of the devices 103 104 105 106 107.

Someone on the telephone 104 would decide that she needed to check movie times. She would push a series of buttons on the telephone 104 and would be prompted with options of available tasks. She would select the movie time lookup and say the movie name. The invention would then utilize the computer's 106 internet connection to perform the lookup. The results would be reported through voice over the phone to the user.

Doing multiple things at once is also possible with this invention. Someone wishing to watch a television show on the monitor 105 while someone wishing to use the computer 106 on the television 103 would only require the addition of a wireless keyboard and mouse placed at the television 103. The monitor 105 would display the video feed which is normally displayed by the television 103, and the television would display the results from the computer 106 as it is interacted with by the keyboard and mouse.

These are just a few examples of combinations of control, output, and source devices. The goal of the invention is to allow all the devices in a household to interact with each other. The following are descriptions of the different components of the invention to allow the integration of electronic devices.

Figure 2:
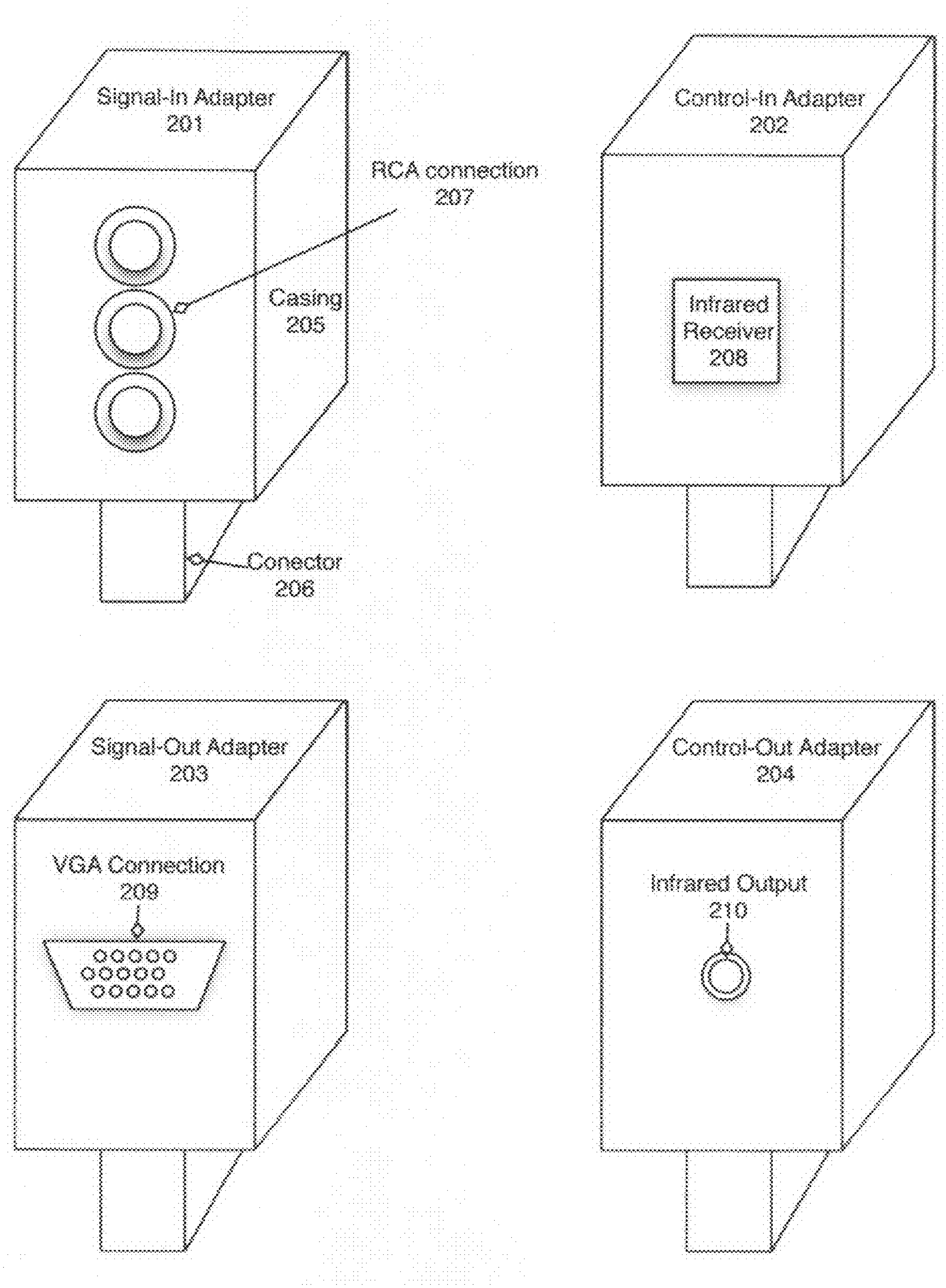
FIG. 2 shows examples of different types of adapters.

FIG. 2 shows some embodiments of the different adapters. Present is a Signal-In Adapter 201, a Control-In Adapter 202, a Signal-Out Adapter 203, and a Control-Out Adapter 204. These adapters are shown in a casing 205 which may be representative of how they are housed in practice. These Adapters are modular and connected to a base station (not shown) through a common connector 206. Each of the different Adapters has an ID so the base station is able to recognize it.

The examples of the Adapters shown are an RCA connection 207 for component audio and video as a Signal-In Adapter; a Infrared Receiver 208 to receive commands from remote controls as a Control-In Adapter; a VGA connection 209 for transmitting video data to a monitor as a Signal-Out Adapter; and an Infrared Output 210 which broadcasts infrared signals to a transmitter which can be connected as a Control-Out Adapter. This figure is intended to give an image of how these things can look for the following detailed descriptions.

Figure 3A:
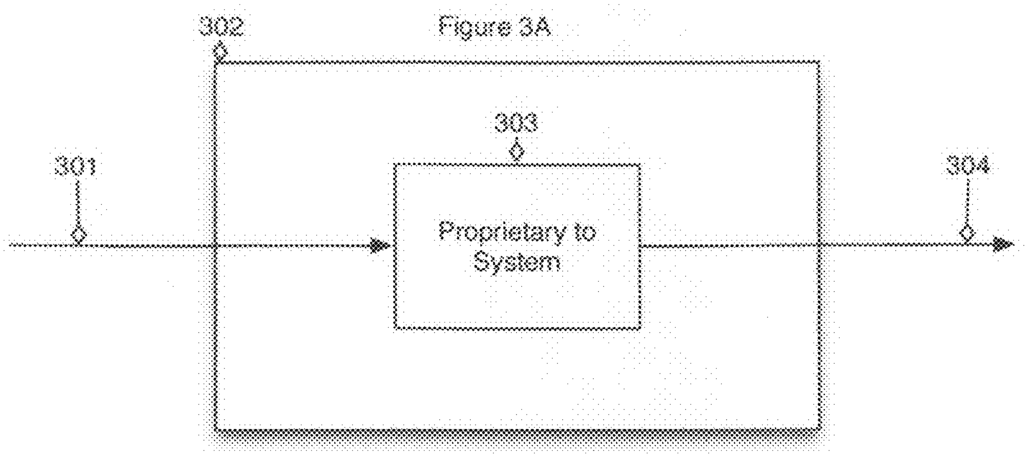
FIG. 3 shows a detailed view of the Signal-In Adapter.

FIG. 3 contains drawings of Signal-In Adapters 302 306. FIG. 3A shows the simplest version of a Signal-In Adapter. It contains conversion hardware 303 to convert the proprietary signal 301 into the System Format 304. This adapter could be used to transform signals coming from something like a cable box, a constant source with pre-determined static signal format.

Figure 3B:
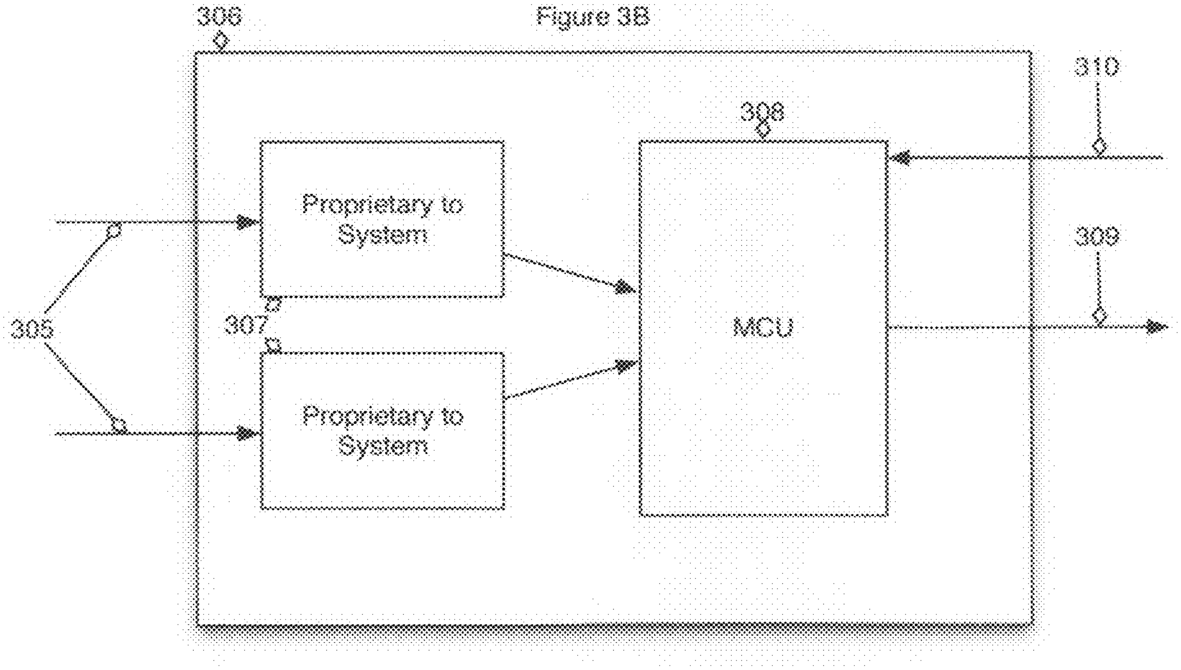

A more complicated, but generic, Signal-In Adapter is shown in FIG. 3B. It contains a processor 308 along with one or more conversion stages 307. The processor 308 can be reprogrammed by the system 310 or instructed to perform different algorithms on the signal. A music stream, for instance, would be converted into a format that the processor 308 can modify by the appropriate conversion hardware 307. The music information could just be passed along without any additional processing occurring, however, it is also an option to run algorithms on the signal in order to extract more information. In the case of music, beat information may be pertinent and a fast Fourier transform could be performed by the MCU 308 to discover the information and is passed along in the System format.

Figure 4A:
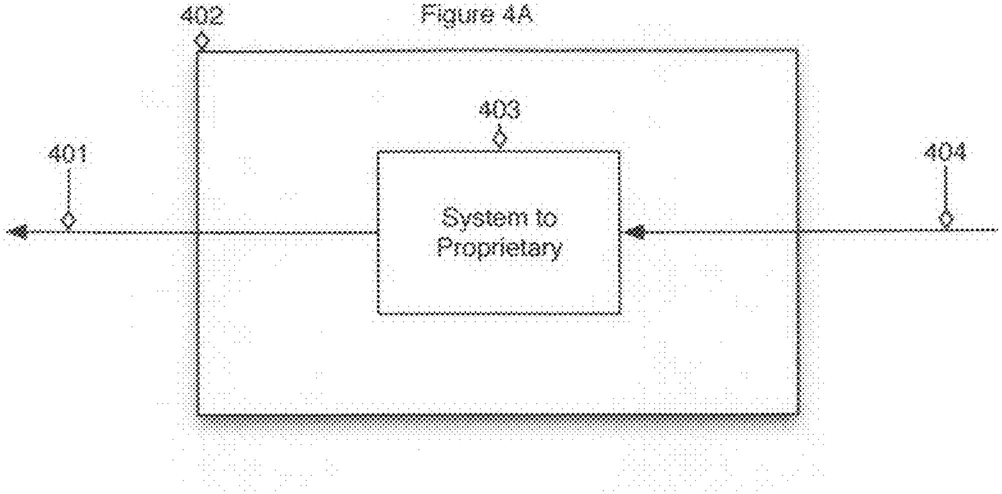
FIG. 4 shows a detailed view of the Signal-Out Adapter.
Figure 4B:
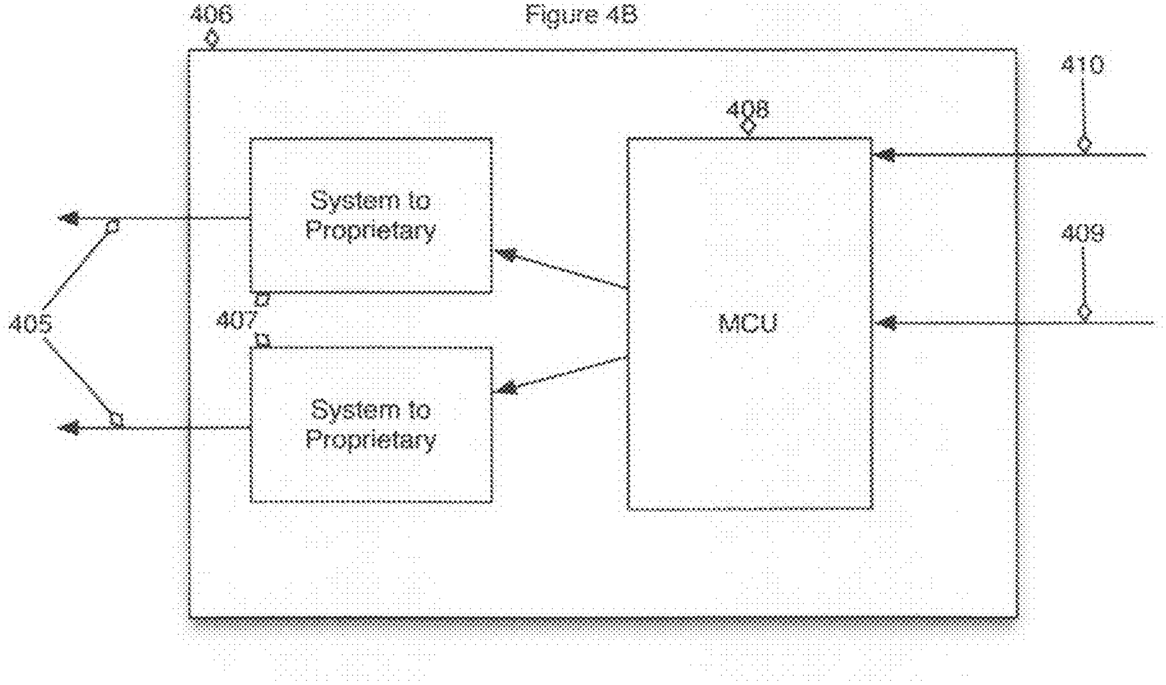

FIG. 4 describes a Signal-Out Adapter. The basic design in FIG. 4A is no different from any other adapter. The System Format 404 is converted by conversion hardware 403 into the proprietary format 401 for something like a television. The advanced case, FIG. 4B, can disseminate one signal 409 to several hardware converters 407 by the control of the MCU 408. The processor can also run algorithms on the data. This may be done at the Signal-Out Adapter 406 in order to save bandwidth. The processor can be reprogrammed 410 by the main system. The reason the signal may be multiplexed is for devices which need different formats to function. A television, for instance, requires both audio and video.

Figure 5A:
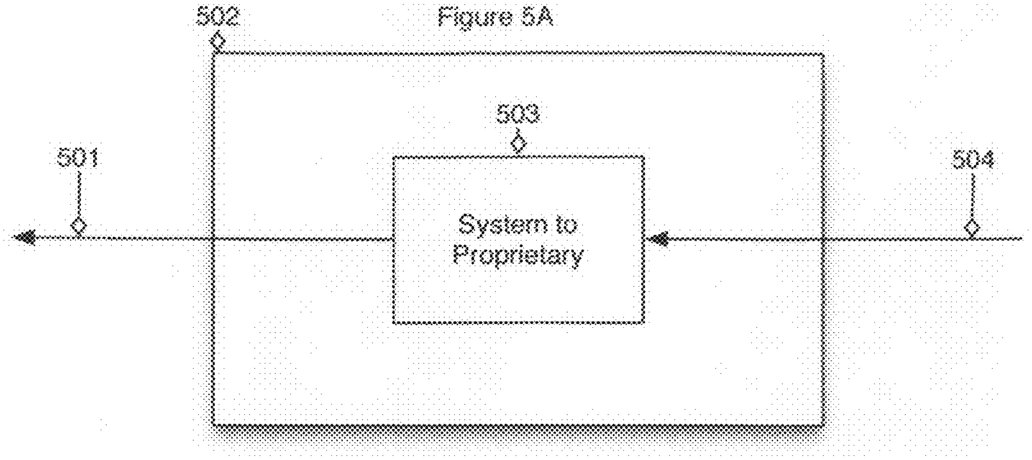
FIG. 5 shows a detailed view of the Control-Out Adapter.

FIG. 5 describes Control-Out Adapters. The Adapter 502 simplest form shown in FIG. 5A It takes the System Format 504 and runs it through conversion hardware 503 resulting in the proprietary signal 501. This simple mechanism would be used for something like controlling a game console, such as an XBox™, where only an XBox™ would ever connect to the Adapter 502.

Figure 5B:
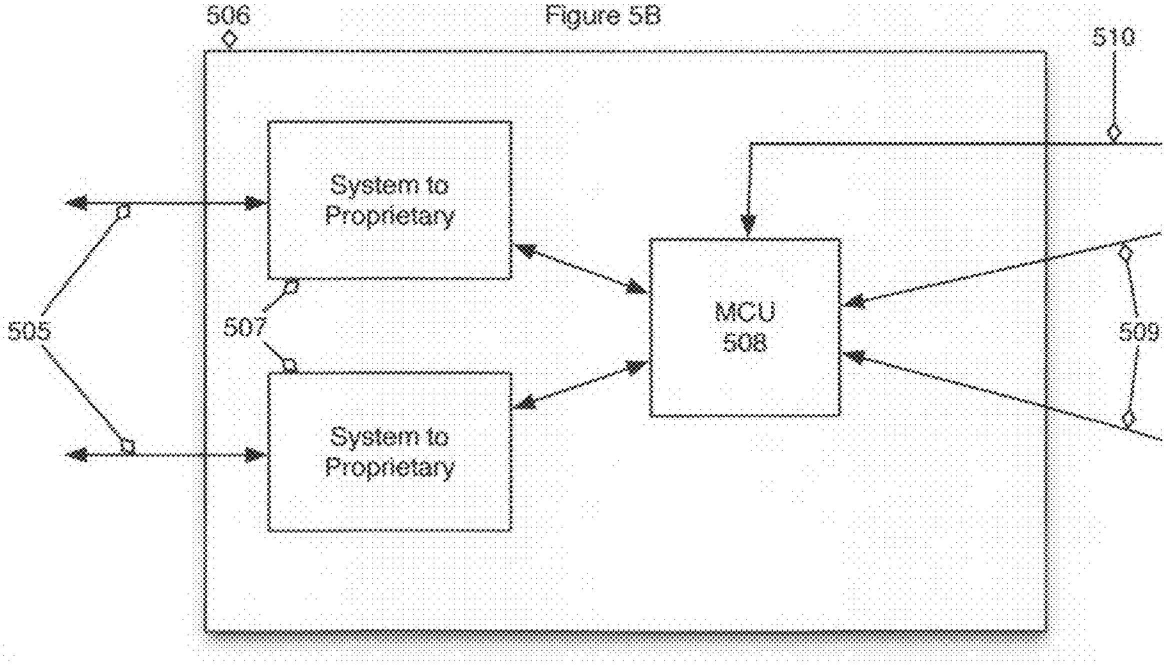

The more versatile version 506 shown in FIG. 5B contains a processor 508 in order to be completely reprogrammable. The Control-Out Adapter 506 does not multiplex control signals to different outputs. If there is a need for a Control-Out Adapter to have multiple proprietary outputs then multiple System Format streams 509 need to be presented. It is important to note, while some output devices could require Signal-Out Adapters with Bluetooth™ capabilities, it is far more likely that control device will require this capability. To signify this there is a bidirectional line of communication to the MCU 508 to allow the necessary pairing with the Bluetooth™ or other protocol. The MCU 508 can be reprogrammed as well by the proper programming line 510.

Figure 6A:
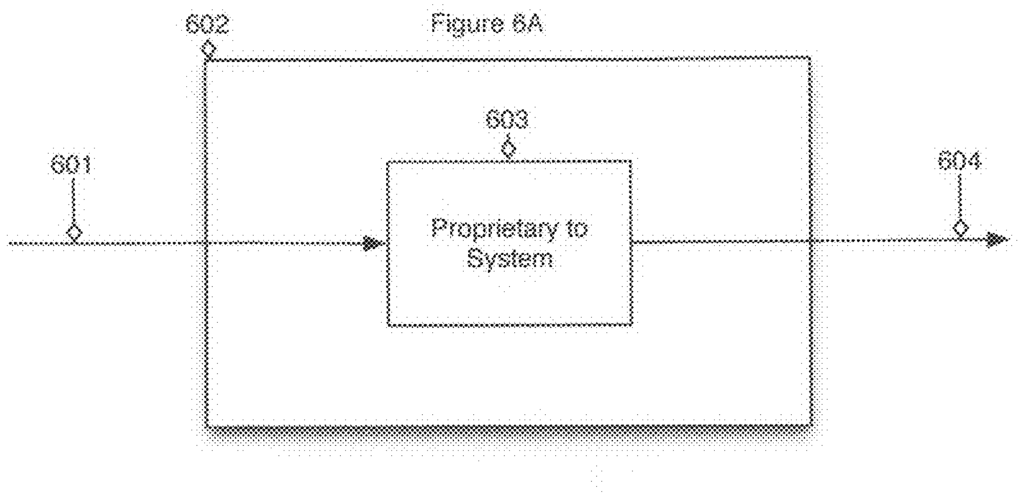
FIG. 6 shows a detailed view of the Control-In Adapter.

FIG. 6 contains drawings of a Control-In Adapter. The basic Adapter 602 in FIG. 6A contains signal processing hardware 603 which converts the proprietary signal 601 into the System Format 604. An example of a Control-In Adapter that might look like this is for a game controller since the specifics will remain constant. To be clear, the reason game console adapters are not to be generic is that each game console has a proprietary connector.

The generic Control-In Adapter 606 is shown in FIG. 6. A MCU 608 is included along with signal processing hardware 607. The processor 608 can be reprogrammed 611 as with all of the other Adapters with MCUs. Using the processor there can be multiple control signals 605 but only one control signal 605 can be processed at a time. A multiplexor 610 is added to ensure this is the case. Like the Control-Out Adapter, there is bidirectional communication for protocols requiring transactions. A Wii Mote™ is a device that may use this type of Adapter 606. It communicates over Bluetooth™.

As it can be seen, all of the conversion cards have the same functioning patterns, the difference between them is the conversion hardware and how they have to handle multiple signal sources and syncs.

Figure 7:
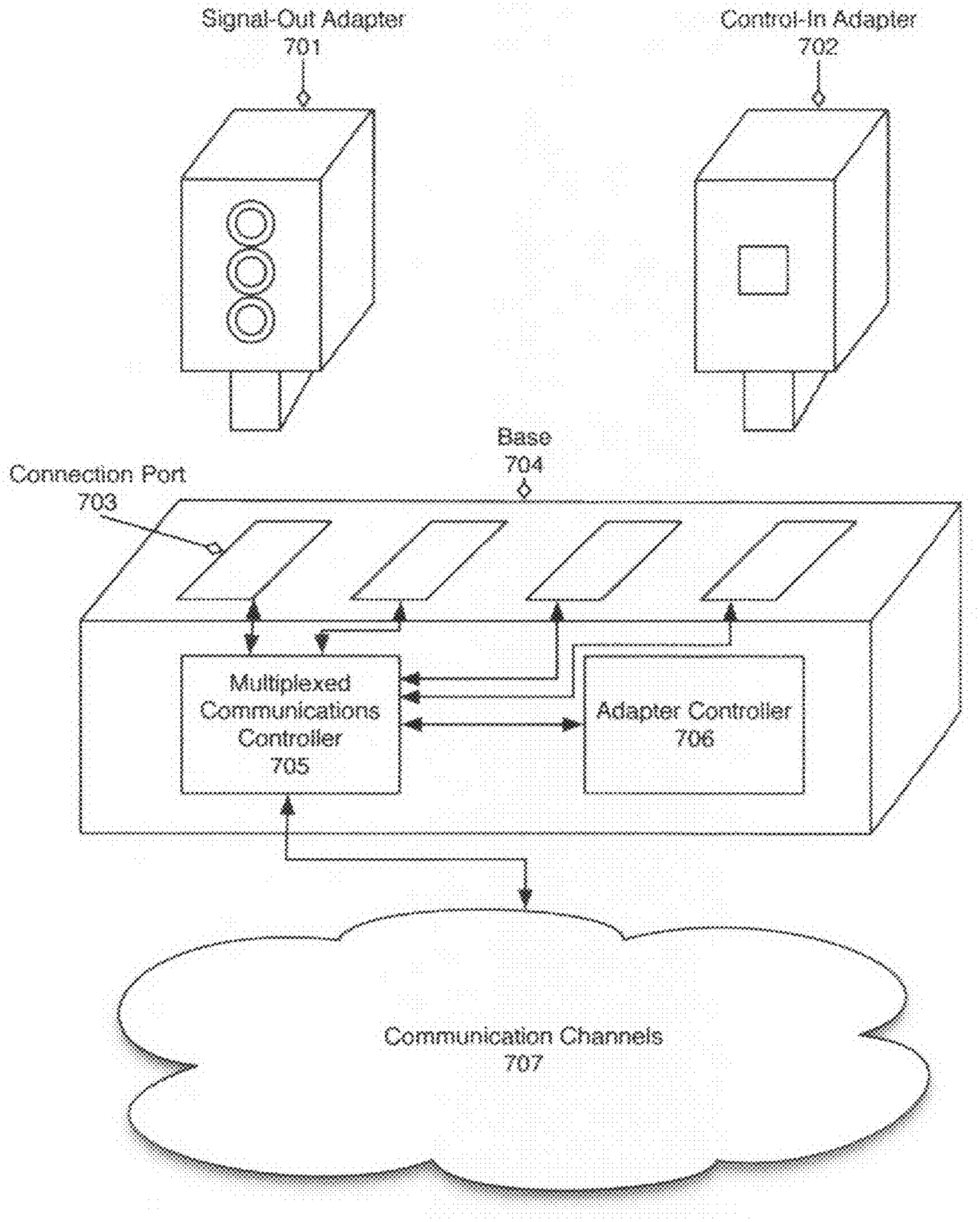

With the Adapters described and examples given FIG. 7 shows what a possible base device would look like. Adapters can exist on their own as long as they have a communication line, however, often multiple Adapters will be needed at a device such as a Control-Out Adapter and a Signal-In Adapter in order to control and view a cable box.

FIG. 7 contains two Adapters 701 and 702 which are connected to the base 704 by the connection ports 703. There are two systems in the base 704, the multiplexed communications controller 705 and the adapter controller. The multiplexed communications controller is described in detail in FIG. 8 and FIG. 9. It basically provides access to available communication channels 707 and is in control of which channels go to which adapter 701 702. The adapter controller 706 provides information to the adapters and can act as a control or source device. It communicates through the multiplexed communications controller 705 which will be seen in FIG. 8. The information the adapter controller 706 provides includes things like menu caches for instant feedback, programming for specific adapters, and routing instructions for the multiplexed communications controller 705. If the adapter controller 706 becomes complex enough to contain logic about remote adapters, adapters which are reached through the communication channels 707, then base 704 can function as a Data Scheduler.

Figure 8:
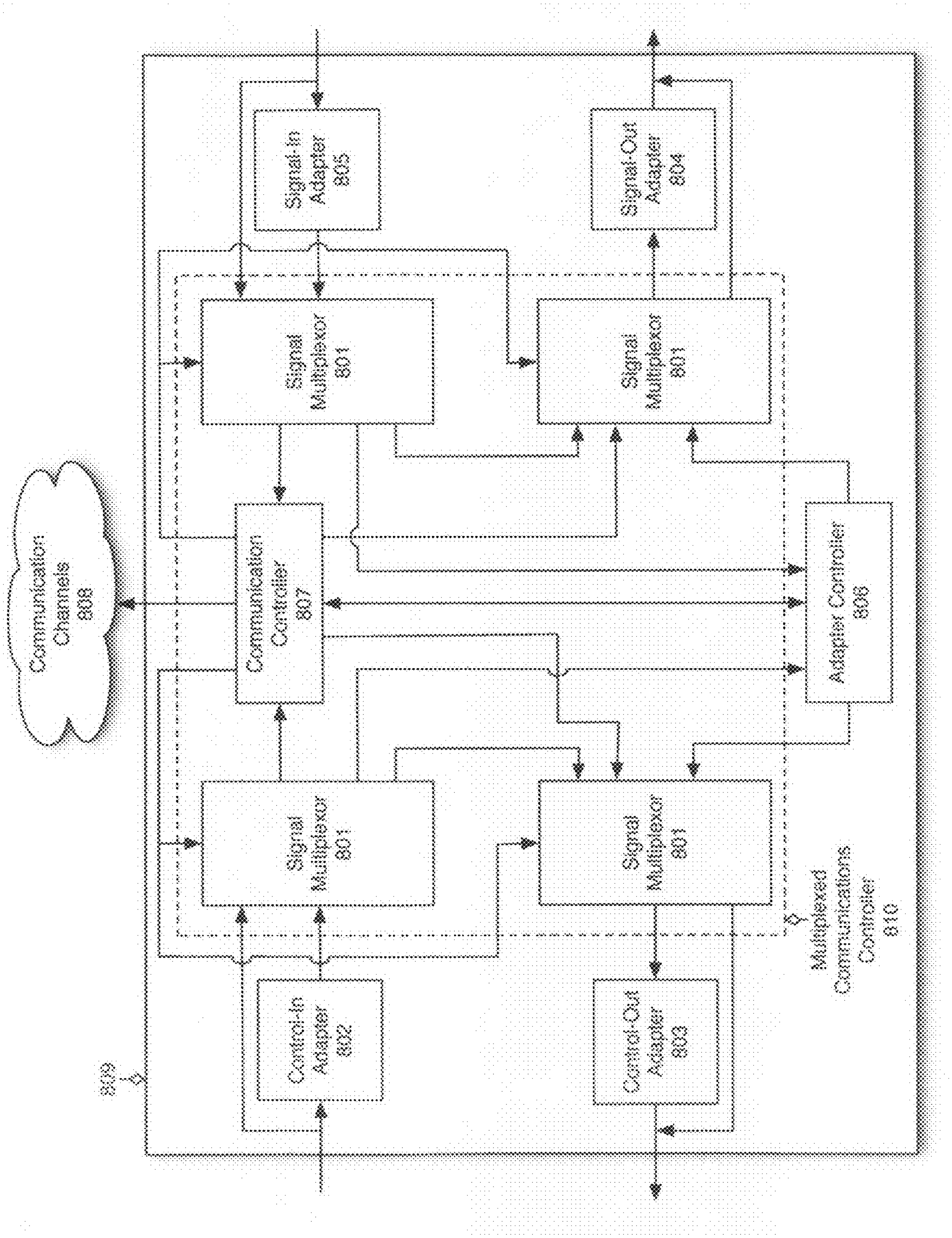
FIG. 8 shows a detailed view of a multiplexed communications controller.

FIG. 8 shows a detailed description of a multiplexed communications controller 810. A communications controller 807 is described in detail in FIG. 9. To simplify things, the base 809 which houses the multiplexed communications controller 810 has four built in adapters: Control-In 802, Control-Out 803, Signal-In 805, and Signal-Out 804. In the same spirit as described below, there can be multiple types of the same adapters in one base 809.

The reason a device would have so many adapters integrated into one is in a situation where there are many components in the same area which may work together already. An example of this is a computer. A computer has connection for a keyboard (a control device), a monitor output (a source device), and a monitor (an output device). A series of multiplexors 801 are configured by the communications controller 808 in order to provide the proper streams of data to the proper adapter. The communications controller 808 receives its instructions directly from the Data Scheduler.

One embodiment to note will act as a passthrough from the Control-In Adapter 802 to Control-Out Adapter 803, and Signal-In Adapter 805 to Signal-Out Adapter 804. The passthrough even can bypass the adapters to enable the use of the device as it was originally intended with no performance loss. In this example, if a keyboard was connected to the Control-In Adapter 802 and the Control-Out Adapter 803 was connected to the connection on the computer, the keyboard would be connected directly to the computer with no delay from signal conversion.

One unmentioned component in this drawing is the adapter controller 806. This component is optional for all base systems 809 and only included when it is known that a certain device would use a lot of the Data Scheduler's resources often to run user interface tasks. Some of these actions include registering controllers, modifying settings for that device, and switching between available signal paths. This could all be done through the Data Scheduler, but with the adapter controller 806 these tasks can be loaded onto the device to lower the communication overhead. The adapter controller 806 can be viewed as a control device and source device as it can understand control commands, and provide an output signal. The adapter controller 806 can become as complex as desired up to the point where it could be a Data Scheduler itself. At the point it became a Data Scheduler, it would not only manage the adapters in the device it is built into, but it would also manage remote adapters.

Figures 9A, 9B:
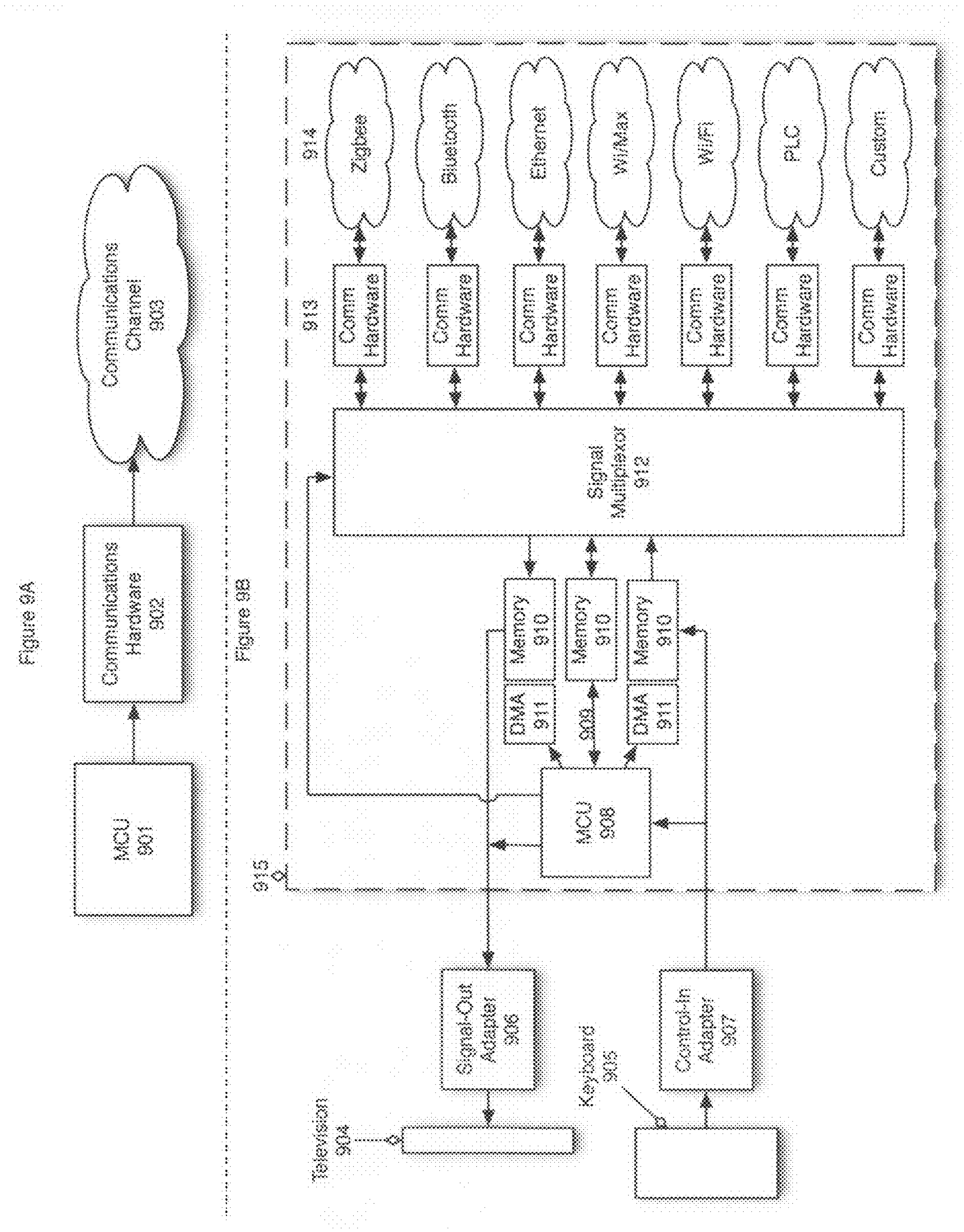
FIG. 9 shows a detailed view of a communications controller.

FIG. 9 describes the communications system for a remote device. It is the communication controller which allows the Data Scheduler to discern the context for the command in terms of the other adapters. FIG. 9A shows the communication portion in the simplest form. It consists of a MCU 901 communications hardware 902 and the communications channel 903. The communications channel can be any communication technology the system is able to communicate with. A few examples are shown in the communications lines 914 in FIG. 3B.

FIG. 9B shows the communications controller 915 in an actual integrated device. In this example the Control-In Adapter 907 and the Signal-Out Adapter 906 are in their simplest forms of just hardware conversion. In this case, the Signal-Out Adapter 906 is connected to a television 904 and a keyboard 905 is connected to the Control-In Adapter 907. The ability to tell which Adapters are being connected to the communications controller 915 comes from the ability for the MCU 908 to query the different adapters. As these adapters 907 906 have no active components, this can be done through identification hardware. The ID can be broadcasted back to the Data Scheduler, or a lookup can be preformed locally depending on the complexity of the communications controller 915. It should be noted that the communications controller's MCU 908 can be reprogrammed by the Data Scheduler.

Using FIG. 9B, an example of the signal path follows. Prior to any outside interaction with the system, the MCU 908 uses the previously determined dedicated communications line 914 to request bandwidth from the Data Scheduler. The MCU 908 queries the different adapters connected 906 907 and reports back to the Data Scheduler. In this instance, there is no memory on the Signal-Out Adapter so the display must be streamed constantly. A higher throughput channel 914, such as ethernet, will be selected. The Control-Out Adapter has a much lower data rate requirement and so a different channel 914 is chosen such as Zigbee™. The data multiplexor 912 are then set accordingly to allow the stream to pass from the proper adapter 906 907 to the proper communication channel 914. It is important to note that while the DMA 911 allows for a passthrough from the communication channel 914 to the Adapters 906 907, it does not mean that the MCU 908 can't be involved. In the case of the keyboard 905 using the Zigbee™ channel 914 the Data Scheduler may tell the communications system 915 to multiplex the Zigbee™ channel 914. This means that the Zigbee™ channel 914 would need to have its data packeted before it could be transmitted. If a key on the keyboard 905 is pressed the MCU 908 can, instead of using the DMA 911, process the command and stream it to its own memory buffer 909.

With the communication procedures set up, the system is then ready to be used by the user. In this example the return key on the keyboard 905 is pressed. The Control-In Adapter 907 converts the key press and the DMA 911 loads the result into memory 910. The DMA 911 then transfers the data to the communications hardware 913 for the Zigbee channel 914. The Data Scheduler performs actions internally to generate the feedback for the television 904. The context is able to discern which content to update because of the known communications channel 914. The context also contains the communications channel 914 for the display, which was previously allocated as ethernet. The ethernet communications hardware 913 picks up the signal and the multiplexor 912 and passes the data into the proper memory buffer 910 with the help of the DMA 911.

Figure 10:
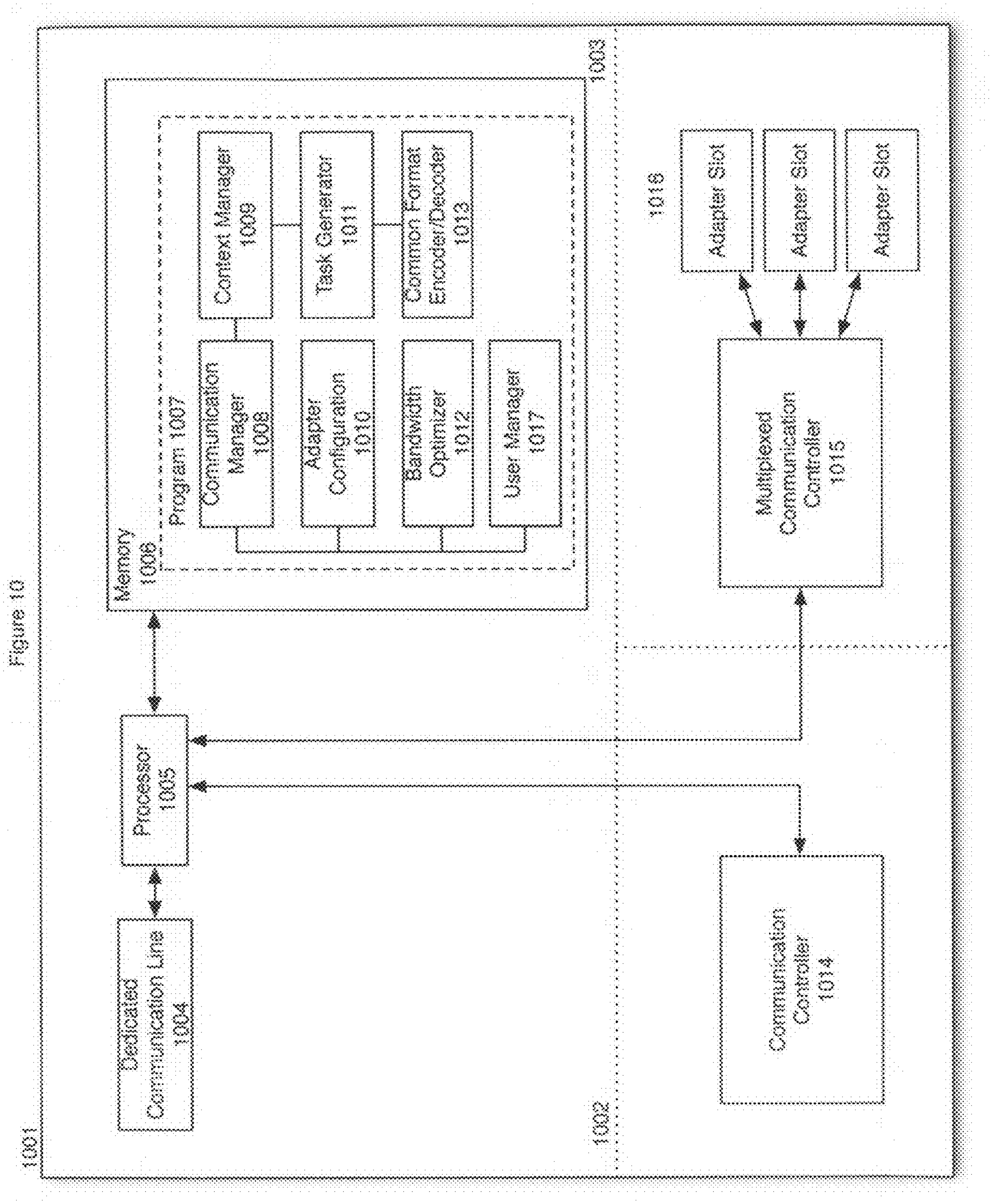
FIG. 10 shows a detailed view of the Data Scheduler.

FIG. 10 shows a complete Data Scheduler 1001 with all of the functions it must be able to perform. The top half of the Data Scheduler 1001 contains all of the mandatory components. On top of the base components, the Data Scheduler 1001 can include a communications controller 1002 or a multiplexed communications controller 1003. The requirements for the Data Scheduler 1001 are simple. It must have one communications line 1004; it must have a processing component 1005; and it must have memory 1006 loaded with proper programming 1007. Since these are the only requirements, a computer with only a Bluetooth™ communication abilities could be used as a Data Scheduler 1001. A router could be used to diversify the communication methods available which would look like the multiplexed communications controller in FIG. 8 but without any adapters.

The key program functions that must be present are the communications manager 1008, the context manager 1009, the task generator 1011, the adapter configurations 1010, the bandwidth optimizer 1012, and the System Format encoder/decoder 1013. The communications manager 1008 is the central process which interacts and orchestrates the others. It keeps track of which communication channels are being used by itself and by all of the adapters it is in charge of. When a request for a new channel stream comes in, the communication manager 1008 passes the information to the bandwidth optimizer 1012 and reports back to the request source the parameters for the channel. When a new adapter is plugged into a modular base, or a new device is initialized, it may request programming. The communications manager 1008 intercepts the request and sends the proper adapter configuration from the adapter configuration manager 1010. The adapter configuration manager 1010 also contains all of the software adapters. The context manager 1009, task generator 1011, and System Format encoder/decoder 1013 are all part of the user interaction functions. When the Data Scheduler 1001 is involved with any user interaction, this block of functions 1009 1011 1013 is able to generate the proper responses and control signals.

FIG. 10 also shows the Data Scheduler can contain a communications controller 1014 or a multiplexed communications controller 1015. The communications controller 1014 is the same communications controller in FIG. 9. The processor 1005 can be seen as a source and control device. Thus, to the communications controller 1014, it can contain the same software as any other communications controller. The multiplexed communications controller 1015 is present when the Data Scheduler 1001 contains Adapter slots 1016.

Figure 11:
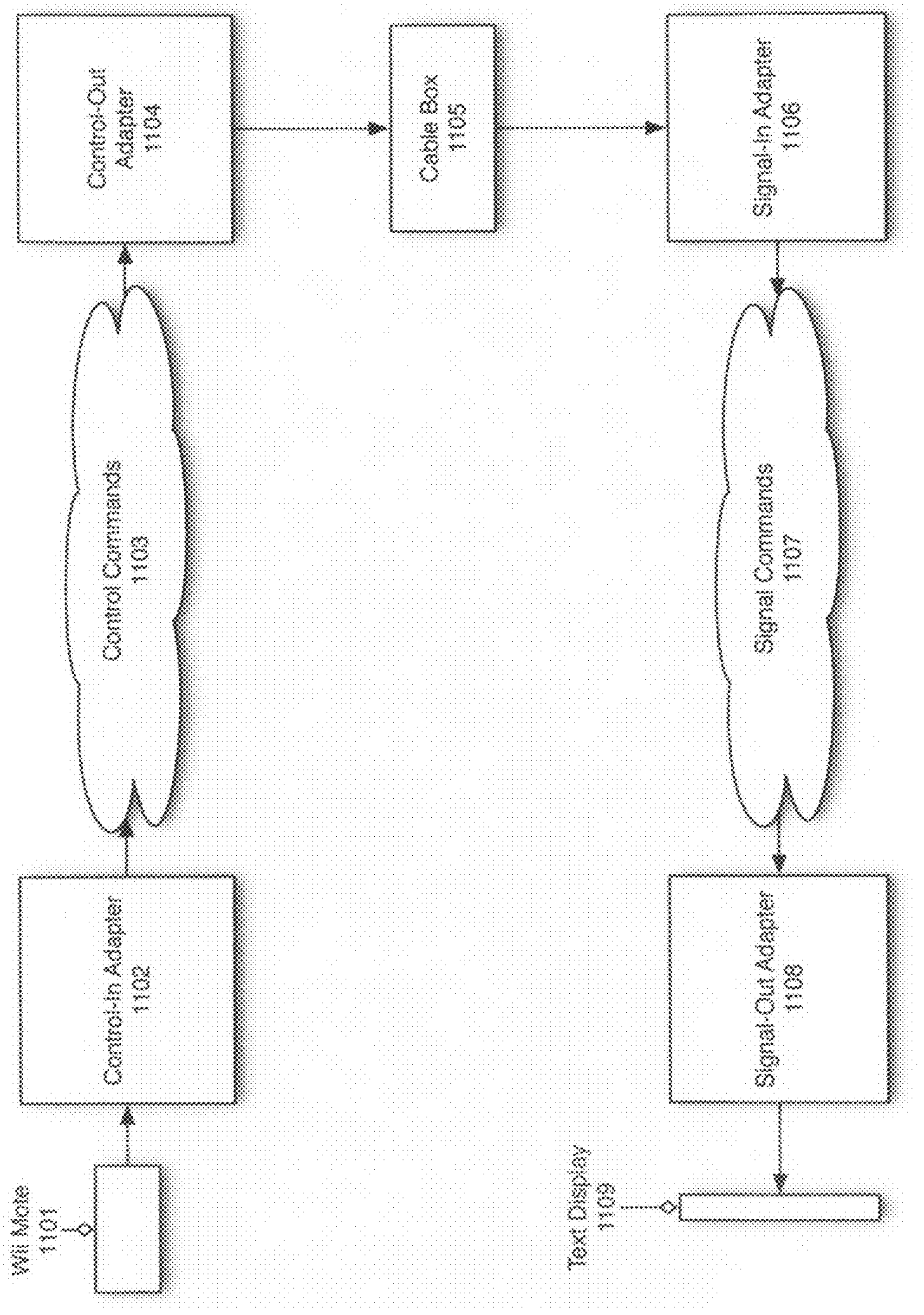
FIG. 11 shows the flow of the System Format between adapters.

FIG. 11 describes more about the workings of the System Format. In this example, the Data Scheduler has already set up the communication channels 1103 1107 and does not interact with the System Format being transmitted. There are two types of commands being transmitted, the control commands 1103 and the signal commands 1107. The control commands 1103 are understood by the Control-In Adapter 1102, the Control-Out Adapter 1104. The signal commands are understood by the Signal-In Adapter 1106, the Signal-Out Adapter 1108. In this example the control device is a Wii Mote™ 1101, the source device is a cable box 1105, and the output device is a text only display 1109. To change the channel, the user presses the up button on the Wii Mote™ 1101. The Control-In Adapter 1102 converts the Wii Mote's™ 1101 Bluetooth™ signal to a command corresponding to "primary up button pressed" in the System Format 1103. The command 1103 is streamed across the channel to the Control-Out Adapter 1104. The Control Out Adapter 1104 converts the command "primary up button pressed" into the proprietary signal for the cable box 1105 for the channel up button pressed. The signal from the cable box 1105 updates and the Signal-In Adapter 1106 converts the stream into signal commands 1107. Due to the domain of signal commands 1108, a large portion of the common format is dedicated to audio video encoding. In this example another type of encoding is used, the Signal-In Adapter 1106 the audio stream with a speech to text algorithm. The Signal-Out Adapter 1108 ignores audio and video information if present and uses the text to for the display 1109. Another possible configuration is the Signal-Out Adapter 1108 could run the speech to text algorithm if audio data were sent from the Signal-In Adapter 1106.

Figure 12:
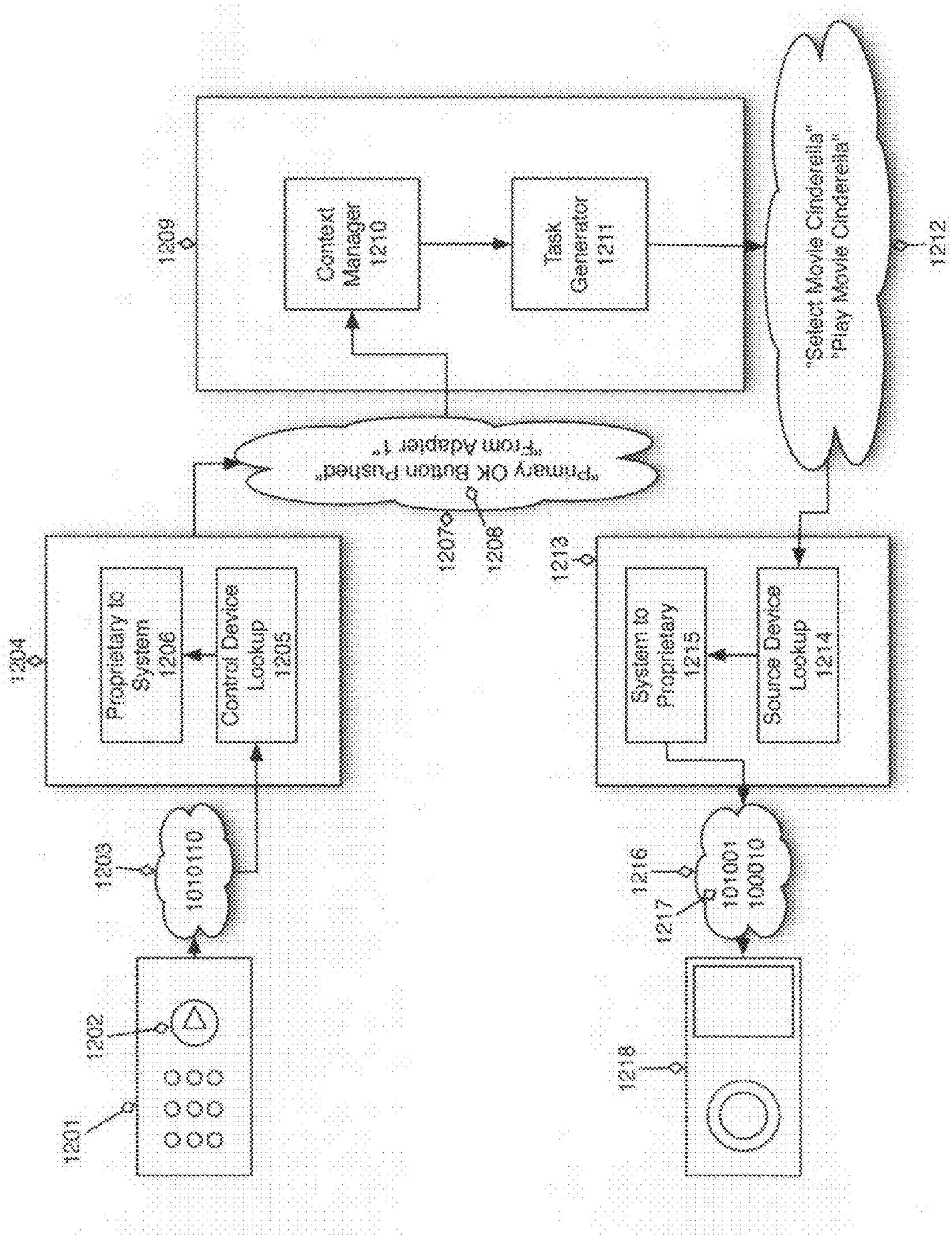
FIG. 12 shows a remote control selecting a movie from an iPod™.

FIG. 12 illustrates the process of selecting the movie, Cinderella, to play off an iPod™ 1218 with an ordinary remote control 1201. This process only contains the signal path from the Control-In Adapter 1204 through the Data Scheduler 1209 to the Control-Out Adapter 1213 and finally to the iPod™ 1218.

Figure 6B:
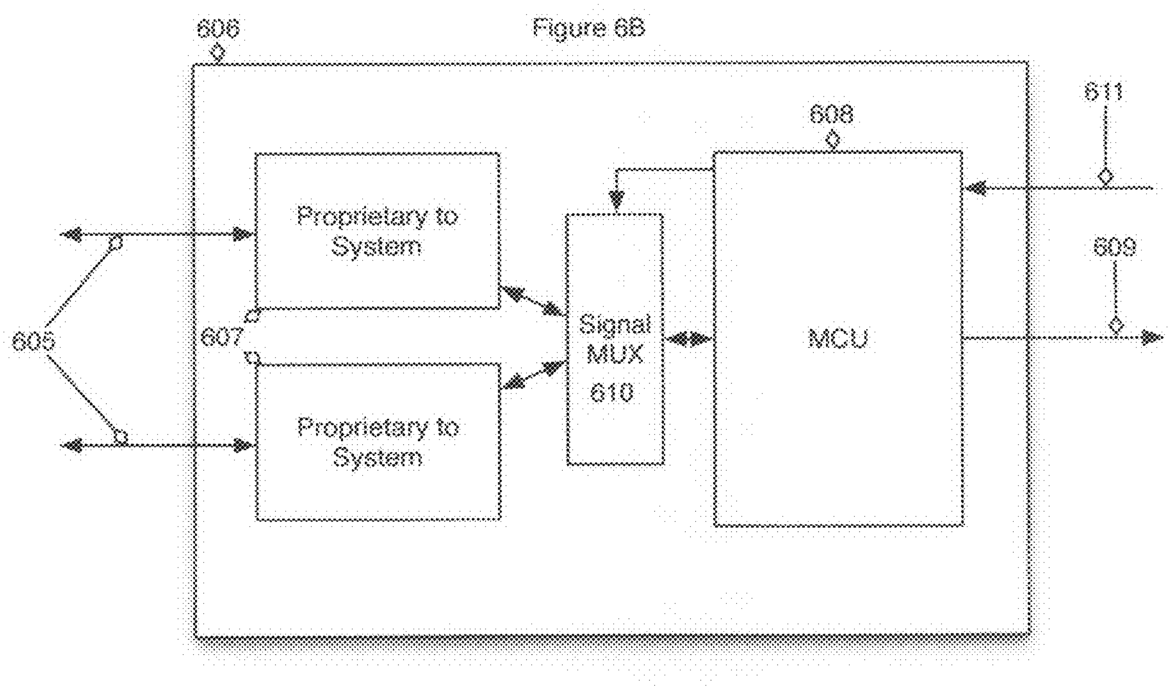

The start of the task begins with the movie selected on the Output Device (not shown). In order to watch the movie, the play button 1202 is pressed. This transmits a proprietary code for the device using an infrared channel 1203. The Control-In Adapter 1204 receives the infrared signal and runs a correlation with the registered Control Devices. The internal process of the Control-In Adapter 1204 shown in the diagram are preformed by the MCU 608 as shown in FIG. 6B. Once a device is determined, the signal is converted 1206 into the System Format 1208. This instruction table is populated by the Data Scheduler 1209 based on which control devices are registered to that Control-In Adapter 1204. The System Format 1208 is then transmitted across whichever communication channel 1207 is available to this Control-In Adapter 1204. The Data Scheduler 1209 receives the instruction 1208 and begins converting it into a task for the Control-Out Adapter 1213. The context is updated by the instruction 1208. The context manager 1210 contains the state of the user interaction, so in this case it contains the knowledge that the user was currently hovering over the movie selection Cinderella. The context 1210 is used by the task generator 1211 to provide the commands to make a selection. The task is generated in the System Format 1212 and transmitted. The System Format is received by the Control-Out Adapter 1213. Based on which source device is connected to the Control-Out Adapter 1213 the proper source device is looked up 1214. The proprietary signal 1217 is then generated for the proper device through the system to proprietary converter 1215. The proprietary signal 1217 is then transmitted through whichever channel is available 1216 to get to the Source Device 1218. The Source Device 1218 will receive the proprietary signal 1217 describing the task 1212 and execute properly.

Figures 13A, 13B:
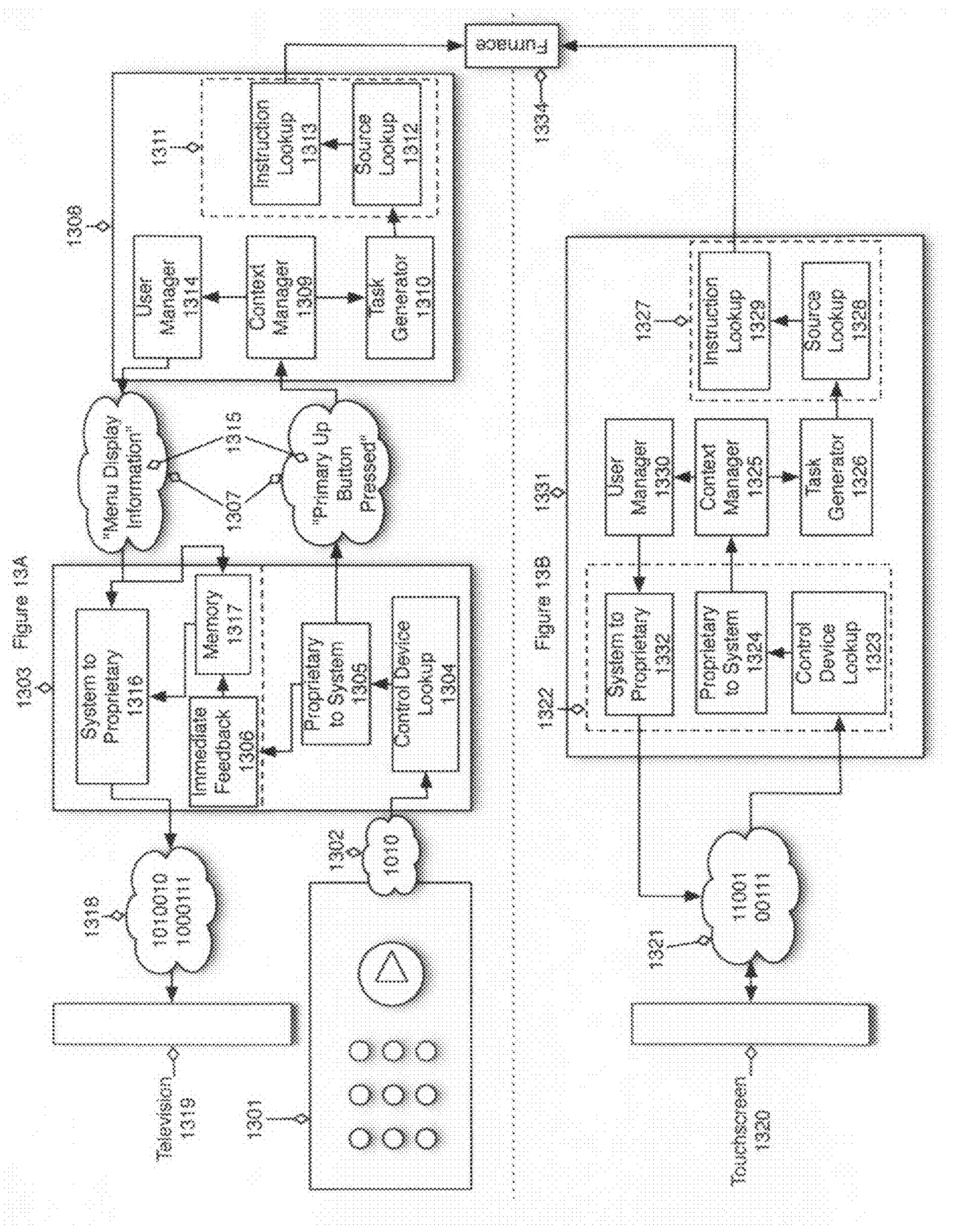
FIG. 13 shows how to control a furnace using two different control devices.

FIG. 13A illustrates one possible interface with the system by using a television remote 1301 as the control device and a television 1318 as the output device. The task is to increase the temperature on the furnace 1334.

The user has already browsed to the proper panel displaying the status of the furnace 1334. The heating system 1334 may be complex and require the user to browse to the room they wish to control. Once the user is on the proper screen to adjust the temperature, they press the channel up button on the remote 1301. The remote 1301 transfers the proprietary signal 1302 to the Control-In Adapter 1303. In this case the Control-In Adapter and Signal-Out Adapter are built into the same device 1303. The signal 1302 is used to find the proper control device from the lookup 1304 and then the instruction is decoded 1305. In the System Format, the instruction 1315 corresponds to "primary up button pressed". The instruction is then sent across which ever communication band 1307 has been allocated by the Data Scheduler 1308. This may be multiplexed with the signal for the television 1319 or on its own channel 1307. The System Format 1315 is received by the Data Schedular 1308 and passed to the Context Manager 1309. In this case, the Context Manager takes into account that the primary up button was pressed on the controller 1301 while viewing the furnace selection on the television 1319. With this, the task generator 1310 is able to describe how to turn up the heat which may require several steps. The task is then passed to the Control-Out Adapter 1311 which in this case is purely a software embodiment. The Control-Out Adapter 1311 takes the task and runs a source lookup algorithm 1312 to get the specific instruction set 1313 to access the furnace 1334. The task is then decoded into the proper instructions and sent over the to the furnace 1334 using the Data Scheduler's communication controller (not shown).

At the same time, feedback is being presented to the user about the choice that she just made. The user manager 1314 uses the context manager 1309 in order to calculate the proper feedback for the user. In this case it might be incrementing the temperature reading being displayed. The display information is prepared and translated into the System Format 1315. It is important to note due to bandwidth optimization the least verbose way to describe the signal will be used. If all that is required is a text representation of the temperature to display on a wall panel 1320 then the ascii characters may be transmitted. If both the television 1319 and wall display 1320 are active then the System Format generated has enough information for both Signal-Out Adapters 1303 1322. This ability to discern the proper encoding is stored in the context as the required information directly relates to which Signal-Out Adapter it is in communication with.

The menu signal 1315 is then transmitted to the Signal-Out Adapter 1303 and passed to the converter 1316. In the case of output devices requiring a constant signal such as a television 1319, the menu signal may be cached in memory 1317 in order to be constantly providing the signal. This will prevent the Data Schedular 1308 from constantly streaming the same signal 1315 and wasting bandwidth. After the menu signal 1315 is updated, the signal is converted 1316 into the proprietary signal 1318. The proprietary format 1318 is then displayed on the television 1319.

The Signal-Out Adapter 1303 is capable of immediate feedback 1306 to the user. This immediate feedback 1306, for instance, may be a mouse pointer. As the mouse is moved around, the Control-In Adapter 1303 processes the change in state but determines it is not a note worthy event to transmit to the Data Scheduler 1308. However, it will communicate with the Signal-Out Adapter 1303 about the Control Device's position change. The Signal-Out Adapter 1303 can then adjust the output by using images that were preloaded into memory 1317 by the Data Scheduler 1308. These images may include things such as a different color for options if they are selected, a cursor image for the location of a pointing device, and any other visual or auditory feedback. The memory and immediate feedback are part of the MCU for the combined Adapter 1303.

With proper programming of the Adapter's MCU, areas can be allocated to display content from the different Source Devices. In this example only one source device is shown, the furnace 1334, but it is possible to display media from other Signal-In Adapters. This could be used to show mini previews of what other input devices are currently displaying.

The only difference between FIG. 13A and FIG. 13B is the interface the user is trying to change the temperature with. In FIG. 13B the interface is a touchscreen display 1320 which gets its display information over a Zigbee™ link. The user presses the button on the touchscreen 1320 which corresponds to increasing the temperature. The touchscreen 1320 has been paired with the Data Scheduler 1331 and the proprietary signal 1321 is transmitted. The Data Scheduler 1331 receives the signal and passes it to the different Control-In Adapters 1322 installed. The Control-In Adapter 1322 in this case is purely software. After the proper device is found 1223, the instruction can be decoded 26 1324 into the System Format. From here the system operates the same as FIG. 13A to communicate with the furnace. The context manager 1325 generates the proper context and passes it to the task generator 1326. The result is then passed to the Control-Out Adapter 1327, which in this case is also purely software. The task is transformed into instructions 1329 for the furnace. It is important to note that the reason the source lookup 1328 occurs is that it may be necessary for a task to communicate with multiple Source Devices.

The feedback for the touchscreen display 1320 also follows a similar route as FIG. 13A except the Signal-Out Adapter 1322 is also purely software. In this case, the touchscreen 1320 contains its own internal memory and only updates the display when a new signal 1321 is received. It is also important to note that in the case of the touchscreen 1320, the same channel provides both input and output data 1321. After the feedback is generated by the user manager 1330 for the touchscreen 1320, the system to proprietary converter 1332 performs its operation and the result is transmitted to update the touchscreen 1320.

As it can be seen, there is a lot of variation that can occur in the different adapters. This invention is designed to be flexible for new devices to be integrated with the system and would not be considered an innovation.

I claim:

1. An apparatus comprising:

one or more first adapters, each of the one or more first adapters being a signal-in adapter adapted to transform a source signal from a source device into a signal command in a system format;

one or more second adapters, each of the one or more second adapters being a signal-out adapter adapted to transform the signal command in the system format into an output signal for an output device;

one or more third adapters, each of the one or more third adapters being a control-in adapter adapted to transform an input signal from a control device into a control command in the system format;

one or more fourth adapters, each of the one or more fourth adapters being a control-out adapter adapted to transform the control command in the system system format into a control signal to control a one of the source device and the output device; and a processor operatively coupled to and adapted to orchestrate communications between the one or more adapters and adapted to provide signals to generate at least one user interface for use by a user to control the one or more adapters and their operatively coupled devices.

2. The apparatus of claim 1 further comprising, a base; and one or more casings;

wherein (i) the processor is enclosed in a one of the base and a first casing of the one or more casings and (ii) at least one adapter of (a) the one or more first adapters, (b) the one or more second adapters, (c) the one or more third adapters, and (d) the one or more fourth adapters is enclosed in a second casing of the one or more casings.

3. The apparatus of claim 2, wherein at least one casing of the first casing and the second casing includes a connector adapted to be plugged into a connection port of the base.

4. The apparatus of claim 2 further comprising, a repeater, the repeater operatively coupled to the processor and the at least one adapter.

5. The apparatus of claim 2 further comprising, a router, the router operatively coupled to the processor and the at least one adapter.

6. The apparatus of claim 2, wherein:

the at least one adapter is substantially enclosed in the second casing and includes an RCA connector, the RCA connector adapted to receive component audio and video, the second adapter is substantially enclosed in a third casing of the one or more casings and includes a VGA connection, the VGA adapted to transmit video, the third adapter is substantially enclosed in a fourth casing of the one or more casings and includes an infrared receiver, the infrared receiver adapted to receive commands, and the forth adapter is substantially enclosed in a fifth casing of the one or more casings and includes a USB connection, the USB connection is adapted to transmit keyboard commands.

7. The apparatus of claim 1, wherein at least one adapter of (a) the one or more first adapters, (b) the one or more second adapters, (c) the one or more third adapters, and (d) the one or more fourth adapters is adapted to transmit and receive wireless signals.

8. The apparatus of claim 1, wherein at least one adapter of (a) the one or more first adapters, (b) the one or more second adapters, (c) the one or more third adapters, and (d) the one or more fourth adapters comprises software installed on at least one device of (w) the source device, (x) the output device, (y) the control device, and (z) a data scheduler device having the processor therein.

9. The apparatus of claim 1, wherein the source device is a thermostat, the output device is a television, and the control device is a remote control.

10. A system for enabling unlike device integration, the system comprising:

one or more first adapters, each of the one or more first adapters being a signal-in adapter adapted to transform a source signal from a source device into a signal command in a system format;

one or more second adapters, each of the one or more second adapters being a signal-out adapter adapted to transform the signal command in the system format into an output signal for an output device;

one or more third adapters, each of the one or more third adapters being a control in adapter adapted to transform an input signal from a control device into a control command in the system format;

one or more fourth adapters, each of the one or more fourth adapters being a control out adapter adapted to transform the control command in the system format into a control signal to control a one of the source device and the output device; and a data scheduler, the data scheduler having, a processor, a communications line operatively coupled to the processor, and a memory device operatively coupled to the processor, the memory device having stored thereon programmable instructions, the instructions when executed by the processor causing the processor to, access a communication manager module in the memory device when the processor receives a request for a new channel stream from a one adapter of (a) the one or more first adapters, (b) the one or more second adapters, (c) the one or more third adapters, and (d) the one or more fourth adapters, access a bandwidth optimizer module in the memory device after the processor receives the request for the new channel stream to establish parameters for the new channel stream, and transmit the parameters for the new channel stream to the one adapter via the communications line.

11. The computer system of claim 10, the programmable instructions when executed by the processor causing the processor to further:

intercept a request for programming from an other adapter of (a) the one or more first adapters, (b) the one or more second adapters, (c) the one or more third adapters, and (d) the one or more fourth adapters when the other adapter is initialized, access an adapter configuration manager module in the memory device after the processor intercepts the request for programming to obtain an adapter configuration for the other adapter, and transmit the adapter configuration to the other adapter via the communications line.

12. The system of claim 10, further comprising:

a base, and one or more casings, wherein the processor is enclosed in the base, an other adapter of (a) the one or more first adapters, (b) the one or more second adapters, (c) the one or more third adapters, and (d) the one or more fourth adapters is enclosed in a first casing of the one or more casings, and the programmable instructions when executed by the processor causing the processor to further:

intercept a request for programming from the other adapter when the first casing is plugged into the base, access an adapter configuration manager module in the memory device after the processor intercepts the request for programming to obtain an adapter configuration for the other adapter, and transmit the adapter configuration to the other adapter via the communications line.

13. The system of claim 10, the programmable instructions when executed by the processor causing the processor to further:

access a context manager module, a task generator module, and a system format encoder/decoder module in the memory device when the processor receives a request for a user interaction, and generate a user interface on a display coupled to the one or more second adapters.

14. A method for enabling unlike device integration comprising:

providing a system, the system comprising, at least one data scheduler, the at least one data schedule comprising a first processor, a communications line operatively coupled to the first processor, and a memory device operatively coupled to the first processor, the memory device having stored thereon programmable instructions including a communications manager module adapted to cause the first processor to interact and orchestrate communications with other program modules and keep track of communications channels being utilized, at least one signal-in adapter adapted to transform a source signal from a source device into a signal command in a system format, at least one signal-out adapter adapted transform the signal command in the system format into an output signal for an output device, and at least one control-in adapter adapted to transform an input signal from a control device into a control command in the system format, and at least one control-out adapter adapted to transform the control command in the system format into a control signal to control a one of the source device and the output device;

establishing a first communications channel for control commands between a first control-in adapter and a first control-out adapter;

establishing a second communications channel for signal commands between a first signal-in adapter and a first signal-out adapter; and controlling the source device of the first signal-in adapter by entering the third signal from the control device of the first control-in adapter.

15. The method of claim 14 further comprising, outputting information in the source signal from the source device in the form of the output signal to be received by the output device of the first signal-out adapter, wherein the source device and the output device are unlike devices.

16. The method of claim 15, wherein, (i) the control device is a game console, (ii) the source device is a cable box, (iii) the output device is a text-only display, (iv) said entering the instruction from the control device comprises pressing the up button on the game console, (v) the instruction from the control device to be transformed into the system format is encoded in a Bluetooth signal transmitted by the game console, (vi) the instruction from the control device is converted to a primary up button pressed command in the system format, and (vii) the primary up button pressed command in the system format is converted to the command to control the source device.

17. The method of claim 16, wherein, (viii) the first signal-in adapter is further adapted to convert the source signal from the cable box from speech to text and transforming the source signal into the signal command in the system format, and (ix) said outputting information in the source signal from the cable box comprises displaying text whereby the first signal-out adapter ignores audio and video information and sends text information converted from the source signal to the text-only display.

18. The method of claim 14, wherein, (i) the control device is a regular remote control, (ii) the source device is an iPod, (iii) said entering the instruction from the control device of the first control-in adapter comprises pressing play on the regular remote control when a movie has been selected, (iv) the instruction from the control device to be transformed into the system format is encoded in an infrared channel transmitted by the regular remote control and received by the first control-in adapter, (v) the first control-in adapter is further adapted to identify registered control devices and verify that the regular remote control is a one of the registered control devices, and (vi) the data scheduler receives the instruction from the control device and converts the instruction into a task for the first control-out adapter by having the first processor access a context manager module and task generator module.

19. The method of claim 14, wherein the system further comprises, a multiple communications controller, the multiple communications controller having a second control-in adapter, a second control-out adapter, a second signal-in adapter, and a second signal-out adapter; and the method further comprises, establishing a third communications channel for control commands between the second control-in adapter and the second control-out adapter;

establishing a fourth communications channel for signal commands between the second signal-in adapter and the second signal-out adapter;

establishing a fifth communications channel for control commands between the first control-in adapter and the second control-out adapter;

establishing a sixth communications channel for signal commands between the first signal-in adapter and the second signal-out adapter;

establishing a seventh communications channel for control commands between the second control-in adapter and the first control-out adapter; and establishing a eight communications channel for signal commands between the second signal-in adapter and the first signal-out adapter.

20. The method of claim 14, wherein the system further comprises, a second data scheduler, the second data scheduler comprising a second processor, a communications line operatively, coupled to the second processor, and a memory device operatively coupled to the second processor, the memory device having stored thereon programmable instructions including a communications manager module adapted to interact and orchestrate communications with other program modules and keep track of communications channels being utilized, and the operation of the second data scheduler and second processor therein is controlled by the first processor, wherein the second data schedule cannot communicate with the at least one signal-in adapter , the at least one signal-out adapter, the at least one control-in adapter, and the at least one control-out adapter of a first data scheduler comprising the first processor.

* * * * *